May 23, 1961 S. R. DICKINSON 2,985,189
SEALS FOR VALVES AND THE LIKE
Filed Feb. 27, 1959

INVENTOR
Scott R. Dickinson his Attorneys 2,985,189

SEALS FOR VALVES AND THE LIKE

Scott R. Dickinson, Shaler Township, Allegheny County, Pa., assignor to Miller Printing Machinery Co., a corporation of Pennsylvania Filed Feb. 27, 1959, Ser. No. 795,984

3 Claims. (Cl. 137—599)

This invention relates to seals for valves and the like and particularly to a seal capable of releasing excessive valve pressures. Since this invention has particular adaptability to valve structures, it will hereinafter be particularly described in the body of a valve.

In the manufacture of valves and like apparatus for use in fluid conveying lines it is frequently the practice to use port insert rings in both the inlet and outlet ends of the fluid passage to eliminate the need for fine and intricate machining in the body of the valve, to permit limited flexibility of the port closing surface and for other reasons. Conventionally, these port insert rings are provided with an O-ring seal inserted in an annular groove between the ring and valve body. A very real difficulty that has been experienced results from the expansion of the fluid trapped inside the valve body when the valve is closed. When the temperature rises, for example, the fluid trapped in the valve housing exerts a tremendous pressure on the housing, even to the point of damaging or distorting the valve.

There has long been a need for some means of maintaining a seal in the housing and yet permitting release of this expanded volume of fluid.

The present invention provides a sealing structure which eliminates these difficulties and permits automatic release of high pressure trapped fluid, while at the same time providing the necessary seal.

I provide in an annular connecting ring between two zones of variable pressure one of which is to be released, an annular groove about the periphery of said ring, said groove sloping at its base away from the zone to be released and having a width greater than its depth at the end adjacent the zone to be released and an O-ring in said groove, said O-ring having a cross section greater than the depth of the annular groove adjacent the zone to be released and less than the depth of the groove remote from the zone to be released whereby movement from the end of the groove of lesser depth permits flow of fluid around the connecting ring and movement to the end of lesser depth causes sealing.

Figure 1:
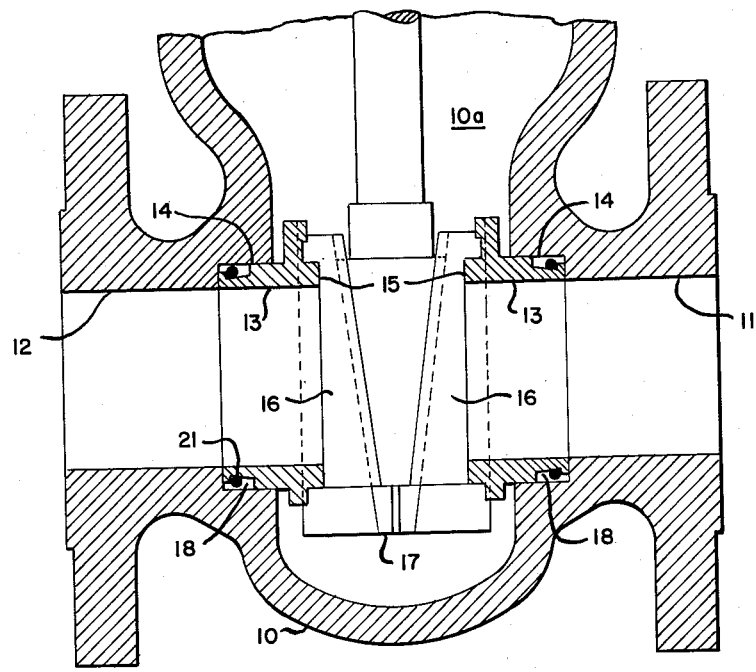
Figure 2:
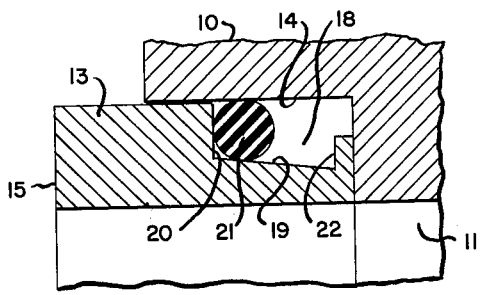
Figure 3:
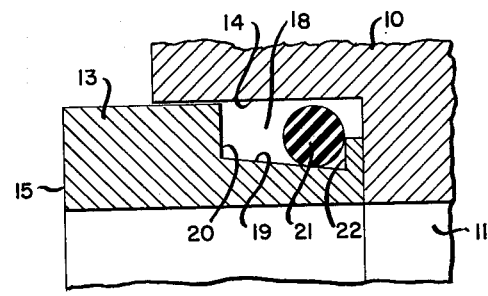

In the foregoing general statement, I have set out certain objects, purposes and advantages of my invention. Other objects, purposes and advantages will be apparent from a consideration of the following description and the accompanying drawings in which, Figure 1 is a vertical section through the body of a gate valve incorporating the invention;

Figure 2 is an enlarged fragmentary section of the sealing structure of Figure 1 in the sealing position; and Figure 3 is an enlarged fragmentary section of the sealing structure of Figure 1 in release position.

Referring to the drawings, I have illustrated a valve body housing 10 having an inlet port 11 and an outlet port 12. Each port 11 and 12 is provided with an annular port insert ring 13 in an annular recess 14 at the internal end thereof. Each insert ring 13 is provided with a sealing face 15 engageable by the closure members 16 of valve gate 17. Each of the insert rings 13 is provided with an annular groove 18 about its periphery within recess 14 and facing toward the inner periphery of recess 14. The groove 18 is provided with a sloping bottom 19 sloping away from the interior of the valve body housing. Each groove 18 has a width greater than its depth at end 20 nearest the interior of the housing. An O-ring 21 is fitted in the annular groove 18. The O-ring 21 has a cross sectional diameter greater than the depth of the groove 18 at end 20 but less than the depth of groove 18 at end 22. When the gate 17 is closed against port ring faces 15 a certain amount of fluid is trapped within body housing 10 within chamber 10a. If the temperature rises this trapped fluid will increase in pressure and will press against O-ring 21 causing it to roll down the sloping bottom 19 away from end 20 (see Figure 2) to the position shown in Figure 3. In this latter position fluid may flow from chamber 10a into ports 11 and 12 thereby relieving the pressure in chamber 10a. When pressure is again exerted in ports 11 and 12 the sealing rings return to the position of Figure 2 thereby sealing the ports from chamber 10a.

It is obvious that the structure of this invention could be used on only the input side of the valve in which case only port 11 would be provided with insert ring 13 and recess 14.

While I have illustrated and described a presently preferred embodiment of my invention, it will be understood that this invention may be otherwise embodied within the scope of the following claims.

I claim:

1. In a valve, having a valve chamber, entry and exit ports to said chamber and a valve closing member in the chamber, an annular port ring for each of the entry and exit ports having a face sealing engaged by the valve closing member, said valve closing member exerting sealing pressure on each said port ring whereby to seal the valve chamber from the ports, an annular groove about the periphery of each said ring, each said groove facing toward the inner wall of a port and sloping at its base away from the valve chamber, each said groove having a width greater than its depth at the end adjacent the valve chamber and an O-ring in each said groove, each said O-ring having a cross section greater than the depth of the annular groove adjacent the valve chamber whereby to engage both the bottom of the groove and the inner wall of the port in sealing position and less than the depth of the groove remote from the valve chamber whereby movement from the end of the groove of lesser depth disengages the O-ring from the inner wall of the port and permits flow of fluid around the connection and movement to the end of lesser depth reengages the O-ring with the wall of the port and causes sealing.

2. In a valve, having a valve chamber, entry and exit ports to said chamber and a valve closing member in the chamber, an annular port ring for each of the entry and exit ports having a face sealing engaged by the valve closing member, said valve closing member exerting sealing pressure on each said port ring whereby to seal the valve chamber from the ports, an annular groove about the periphery of each said ring, each said groove facing toward an inner wall of a port, each said groove being of greater width than depth and having a depth at the side adjacent the valve chamber less than the depth at the side remote therefrom and an O-ring in each said groove, each said O-ring having a cross section greater than the depth of the annular groove adjacent the valve chamber whereby to engage both the bottom of the groove and the inner wall of the port in sealing position and less than the depth of the groove remote from the valve chamber whereby movement from the end of the groove of lesser depth disengages the O-ring from the inner wall of the port and permits flow of fluid around the connection and movement to the end of lesser depth reengages the O-ring with the wall of the port and causes sealing.

3. In a valve having a valve chamber, entry and exit ports to said chamber and a valve closing member in the chamber, an annular port ring for each of the entry and exit ports having a face sealingly engaged by the valve closing member, said valve closing member exerting sealing pressure on each said port ring whereby to seal the valve chamber from the ports, an annular groove about the periphery of the port ring in the low pressure port of said valve, said groove facing toward an inner wall of the port, said groove being of greater width than depth and having a depth at the side adjacent the valve chamber less than the depth at the side remote therefrom and an O-ring in said groove, said O-ring having a cross section greater than the depth of the annular groove adjacent the valve chamber whereby to engage both the bottom of the groove and the inner wall of the port in sealing position and less than the depth of the groove remote from the valve chamber whereby movement from the end of the groove of lesser depth disengages the O-ring from the inner wall of the port and permits flow of fluid around the connection and movement to the end of lesser depth reengages the O-ring with the wall of the port and causes sealing, and sealing means on the high pressure port ring sealing said port ring in the port.

References Cited in the file of this patent
UNITED STATES PATENTS

| | | |
|---|---|---|
| 2,614,793 | Storm | Oct. 21, 1952 |
| 2,670,752 | Laurent | Mar. 2, 1954 |
| 2,726,672 | Doster | Dec. 13, 1955 |
| 2,837,308 | Shand | June 3, 1958 |
| 2,882,009 | Bryant | Apr. 14, 1959 |